United States Patent
Cassidy (10) Patent No.: US 9,213,419 B1
(45) Date of Patent: Dec. 15, 2015

(54) ORIENTATION INCLUSIVE INTERFACE NAVIGATION

(71) Applicant: Amazon Technologies, Inc., Reno, NV (US)

(72) Inventor: Ryan Hastings Cassidy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 94 days.

(21) Appl. No.: 13/675,525

(22) Filed: Nov. 13, 2012

(51) Int. Cl.
*G06F 3/03* (2006.01)

(52) U.S. Cl.
CPC .......................................... *G06F 3/03* (2013.01)

(58) Field of Classification Search
CPC ....... G06F 3/0485; G06F 3/011; G06F 3/017; G06F 3/016; G06F 3/038; G06F 3/03543; G06F 3/0338; G06F 3/03; G06F 3/044; G06F 3/041; G06F 3/04125; G06F 21/36; G06F 21/31; G06F 21/00; G06F 3/031
USPC ........ 345/156, 157, 169; 348/14.05, 114, 734
See application file for complete search history.

(56) References Cited

U.S. PATENT DOCUMENTS

| | | | |
|---|---|---|---|
| 6,201,554 B1 * | 3/2001 | Lands | 345/169 |
| 2004/0100441 A1 * | 5/2004 | Rekimoto et al. | 345/158 |
| 2009/0303204 A1 * | 12/2009 | Nasiri et al. | 345/184 |
| 2010/0060569 A1 * | 3/2010 | Shamilian | 345/156 |
| 2010/0125816 A1 * | 5/2010 | Bezos | 715/863 |
| 2010/0136957 A1 * | 6/2010 | Horodezky et al. | 455/414.2 |
| 2010/0208057 A1 * | 8/2010 | Meier et al. | 348/135 |
| 2011/0221667 A1 * | 9/2011 | Lee | 345/156 |
| 2011/0221777 A1 * | 9/2011 | Ke | 345/649 |
| 2012/0032877 A1 * | 2/2012 | Watkins et al. | 345/156 |
| 2012/0212410 A1 * | 8/2012 | Ikenoue et al. | 345/156 |

FOREIGN PATENT DOCUMENTS

WO  WO 2014/048475  *  4/2014

* cited by examiner

*Primary Examiner* — Md Saiful A Siddiqui
(74) *Attorney, Agent, or Firm* — Novak Druce Connolly Bove + Quigg LLP (57) ABSTRACT

An orientation of a computing device can be determined using at least in part one or more orientation sensors on the computing device. In some embodiments, a location of a head (and a face) of a user of the computing device can be determined and utilized at least in part for the determining of the orientation of the computing device. The computing device can play a media file, for example, via an application capable of media playback. A change to the orientation of the computing device can be determined by the one or more orientation sensors. The playing of the media file can be modified based on the determined change to the orientation of the computing device.

20 Claims, 9 Drawing Sheets

ORIENTATION INCLUSIVE INTERFACE NAVIGATION

BACKGROUND

Computing devices are often used to display and/or play media files, including pictures, video, and audio. A computing device can execute an application, such as an image viewer, a video player, or an audio player, that is capable of playing media files. The computing device (or the media-playing application executing on the device) can provide a scroll bar for adjusting a current playback position of a media file being played. For example, a user of the computing device can tap on and drag the current playback position left or right along the scroll bar to respectively rewind or fast-forward the media file. However, tapping and dragging the current playback position of the media playing using the scroll bar can require a precise touch from the user. In other words, the user has to precisely touch the area on a touch screen of the device that corresponds to the current playback position for the media, and then the user has to precisely move the current playback position in order to navigate to a position at which the media is to resume playing. Furthermore, tapping and dragging the current playback position can at times be difficult to operate using only one hand. These and other issues can be inconvenient, cumbersome, or difficult to the user, thereby reducing the overall user experience for the media playback. As such, an improved approach to interface navigation is needed.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to controlling interface elements using an electronic device. In particular, various embodiments of the present disclosure can determine that a computing device has been tilted, and responsively adjust a user-controllable element of the computing device, where the adjustment is made in a direction corresponding to the tilt. Further, the amount of tilt, rotation, or other change in orientation can determine the amount, rate, or other aspect of the adjustment. For example, a user tilting a device in a certain direction can cause a media presentation application to fast-forward or a rewind the media being presented on the computing device, and the degree of tilt can control the rate of the fast forward or rewind.

At least some embodiments enable an orientation of a computing device to be determined. The orientation of the computing device can be determined based at least in part on using one or more orientation sensors on the computing device. The computing device can also be playing a media file, such as displaying a picture, playing a video, or playing an audio (e.g., music, audio clip, podcast, voicemail, voice note, etc.). For example, the computing device can execute/run an application capable of playing media, such as an image viewer (e.g., a slideshow viewer), a video player, and/or an audio player.

The computing device can determine a change to its orientation. The change to the orientation of the computing device can be determined based at least in part on utilizing the one or more orientation sensors. The computing device (or application running on the computing device) can modify the playing of the media file based on the determined change to the orientation of the computing device. For example, if the change to the orientation is a tilt to the left, the media file being played can be rewound; if the change is a tilt to the right, the media file can be fast-forwarded. In some embodiments, the amount and/or speed of the change in orientation can affect how the playing of the media file is modified.

In some embodiments, the determining of the orientation of the computing device can also be based in part on a location of a head of a user of the computing device. One or more image sensors on the computing device can capture image data representative of image content including a head of the user. The computing device can determine the location of the head of the user (and also a position of a face of the user, the position of the face being at least partially dependent upon the location of the head). In some embodiments, the orientation of the computing device can be determined with respect to a plane that is substantially parallel (i.e., parallel within an allowable deviation) to the face (or to the position of the face) of the user. For example, the device can analyze one or more features on the face of the user to determine the plane that is substantially parallel to the face. In some embodiments, changes in orientation can be with respect to an initial/normalized/default orientation of the device. The initial/normalized/default orientation can be an orientation at which a face of the device is substantially parallel to the face of the user (i.e., the face of the device is substantially parallel to a plane that is substantially parallel to the face of the user). Again, changes in orientation can be measured/determined with respect to the initial/normalized/default orientation of the device.

In some embodiments, a computing device can determine an initial orientation of the computing device using at least one sensor on the computing device. The device, using the at least one sensor for example, can detect a change in orientation of the computing device that exceeds a minimum threshold. The device can determine an active media application executing on the computing device. The device can determine whether the change in orientation is in a first direction or a second direction. The computing device can determine at least one of an angle or a speed of rotation corresponding to the change in orientation. In some embodiments, the angle of rotation or the speed of rotation can be determined utilizing at least in part one or more orientation sensors of the device, such as an accelerometer, gyroscope, etc. Then the device can cause a playback location of media being presented through the application to be moved forward by an amount corresponding to at least one of the angle or the speed of rotation when the change in orientation is in the first direction. The device can also cause the playback location of media being presented through the application to be moved backward by an amount corresponding to at least one of the angle or the speed of rotation when the change in orientation is in the second direction.

Figure 1:
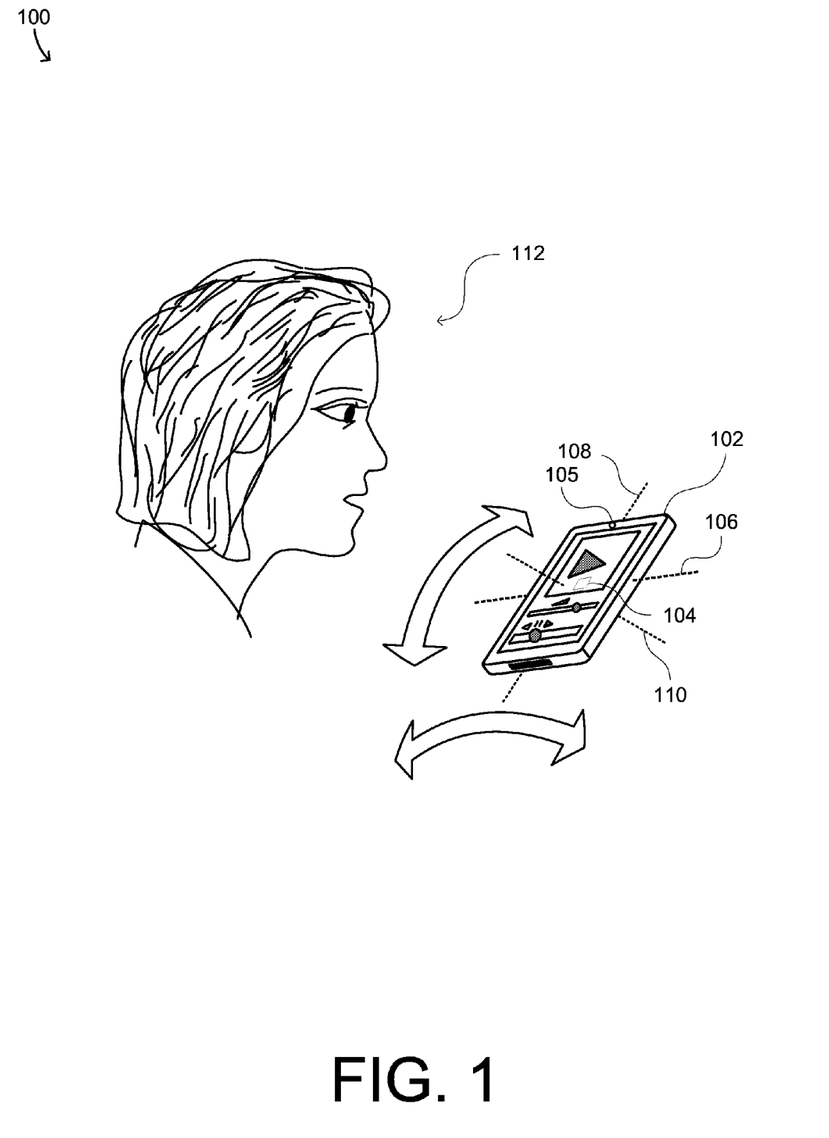
FIG. 1 illustrates an example environment in which aspects of the various embodiments can be utilized.

Various other functions and advantages are described and suggested below as may be provided in accordance with the various embodiments FIG. 1 illustrates an example environment 100 in which aspects of the various embodiments can be utilized. The example environment 100 can comprise a computing device 102. The computing device 102 can include at least one orientation sensor 104, such as a gyroscope or an accelerometer, as well as at least one image sensor 105, such as a camera. The at least one orientation sensor 104 and/or the at least one image sensor 105 can be configured to facilitate in determining an orientation of the computing device 102 and any changes in the orientation of the device 102.

For example, there can be at least three axes with respect to the computing device 102, including a horizontal axis (i.e., abscissa or X axis) 106, a vertical axis (i.e., ordinate or Y axis) 108, and a depth axis (i.e., applicate or Z axis) 110. The orientation of the computing device 102 can be determined by the at least one orientation sensor 104 and/or the at least one image sensor 105 with respect to one or more of the axes 106, 108, and/or 110. Moreover, a change in the orientation of the device 102 can be caused by a tilt, turn, twist, movement, etc., to the device 102 with respect to one or more of the axes 106, 108, and/or 110.

FIG. 1 also shows a user 112 operating the computing device 102. The user 112 can be operating the device 102 to play media, such as a video (e.g., TV show, movie, etc.), an audio (e.g., audio note, voicemail, audio book, song, etc.), a picture (e.g., an image, an image animation, a picture slideshow, etc.), or other similar files. In some embodiments, the user 112 can change the orientation of the computing device 102 in order to adjust one or more aspects associated with a media file being played on the device 102.

Figure 2A:
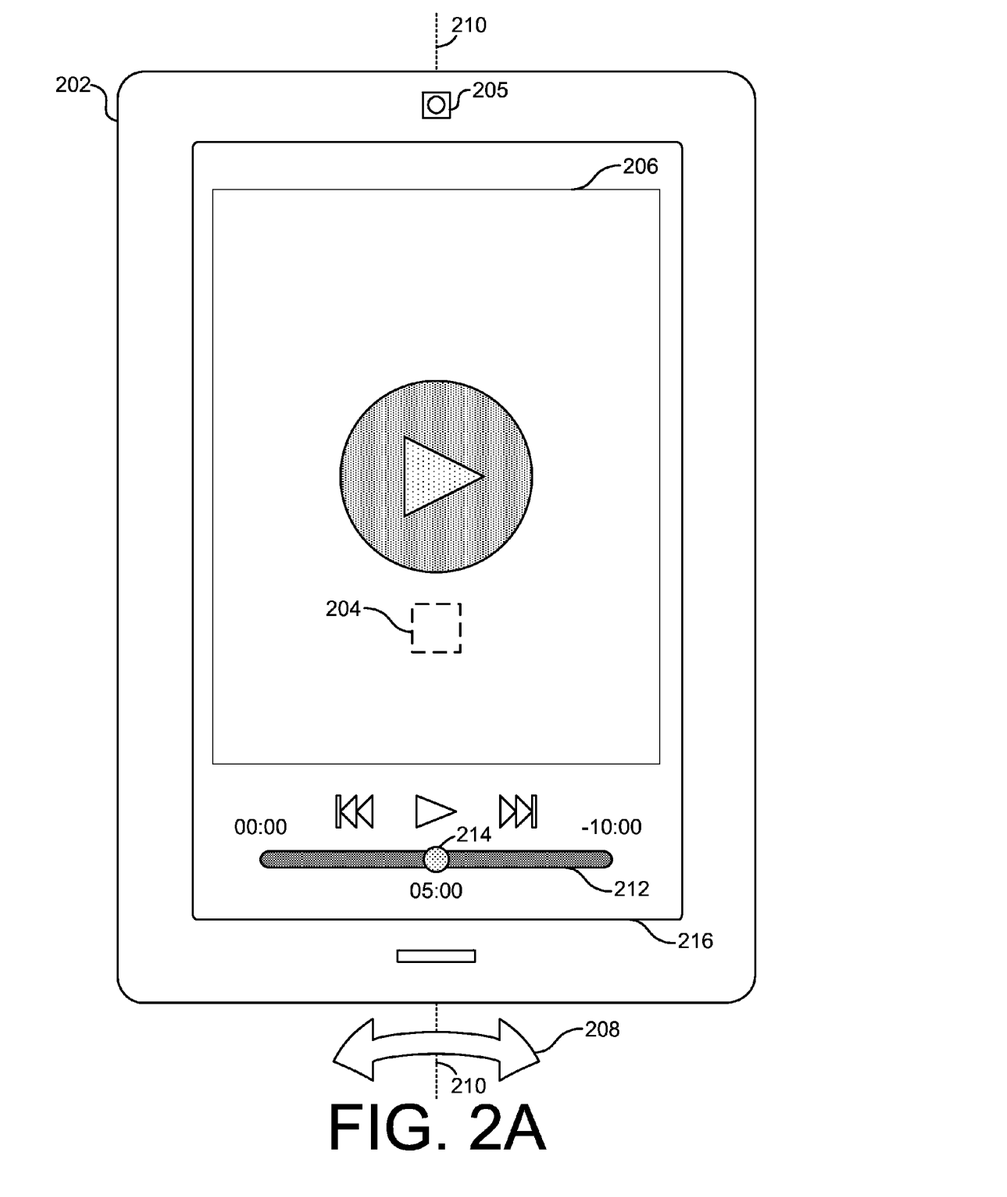
FIG. 2A illustrates an example device embodiment for orientation inclusive interface navigation.

FIG. 2A illustrates an example device embodiment 202 for orientation inclusive interface navigation. In some embodiments, the example computing device embodiment 202 can include an application 206 configured to execute/run on the device 202. The application 206 running on the device 202 can be capable of playing a media. The application 206 can be, for example, a video player, an audio player, and/or an image viewer. A user of the device 202 can utilize the device 202 (or application 206) to play media, such as a video (e.g., TV show, movie, etc.), an audio (e.g., audio note, voicemail, audio book, song, etc.), a picture (e.g., an image, an image animation, a picture slideshow, etc.), or other similar files. The computing device 202 (e.g., via the application 206 running on the device 202) can provide a scroll bar 212 for fast-forwarding, rewinding, or otherwise adjusting a current playback position 214 of the media being played. For example, the user can tap and drag (e.g., on a touch screen 216 of the device 202) the current playback position 214 on the scroll bar 212 either to the left or to the right to rewind or fast-forward, respectively, in order to adjust from where the media is to resume playing.

However, tapping and dragging the current playback position of the media playing using the scroll bar can require a precise touch from the user. In other words, the user has to precisely touch the area on the touch screen (i.e., touch sensor) 216 that corresponds to the current playback position 214 for the media. Then the user has to precisely move the current playback position 214 in order to navigate to a position at which the media is to resume playing. Furthermore, tapping and dragging the current playback position can at times be difficult to operate using only one hand. These and other issues can be inconvenient, cumbersome, or difficult to the user. As such, orientation inclusive interface navigation can offer an alternative approach to adjusting a playback position for a media file being played.

Accordingly, the example computing device embodiment 202 can include at least one orientation sensor 204. The orientation sensor 204 can be configured to detect a tilt 208 of the device 202 with respect to at least a vertical axis (i.e., Y axis) 210 of the device 202. For example, the orientation sensor 204 can be used to detect a direction of the tilt (e.g., to the right, to the left, etc.), an amount of tilt (e.g., how many degrees of tilt, how many radians of tilt, etc.), and/or a speed of the tilt (e.g., an amount of tilt per unit of time, etc.). It is further contemplated that the direction of title, the amount of tilt, and/or the speed of tilt (e.g., the orientation of the device, the change in orientation of the device, etc.) can be determined with respect to one or more axes other than the vertical axis (i.e., Y axis) 210 shown in FIG. 2A.

In some embodiments, the computing device 202 can comprise at least one image sensor (e.g., camera) 205. In some embodiments, in addition to or as an alternative to the orientation sensor 204, the at least one image sensor 205 can be configured to facilitate in determining the orientation of the computing device 202 and any changes in the orientation of the device 202.

For example, the user of the device 202 can tilt the device 202 to the left or right direction with respect to the Y axis 210 to cause the current playback position 214 of a media being played to move left or right, respectively. This in turn can cause the media being played to rewind or fast-forward, respectively.

In some embodiments, the amount, speed, etc., of the tilt can have various effects on the media playback. For example, there can be minimum threshold which the tilt amount must be above for the tilt to count as a media control/interface navigation operation; this is to ensure that a minimal tilt (which may be unintended or accidental) by the user does not alter the playback. The amount of tilt can determine how fast the current playback position of the media being played is to move. For example, if the user tilts the device a small amount (but more than the minimum threshold) to the right, then there can be a small and/or slow fast-forward of the media, and if, for example, the user tilts a large amount to the left, then there can be a large and/or quick rewind of the media, and vice versa. In another example, a quick left tilt can cause a large/ quick rewind whereas a slow right tilt can cause a small/slow fast-forward, and vice versa. In other words, rewinding and fast-forwarding can have speeds that correlate to or are proportionate to the amount and/or speed of tilt to the left and right, respectively. In a further example, a combination of the direction, amount, speed, etc., of the tilt can be utilized for media control/interface navigation; for example, a large, quick tilt to the left can rewind the media to the beginning or can navigate to a previous media file, whereas a large, quick tilt to the right can navigate to a next media file to be played.

Figure 2B:
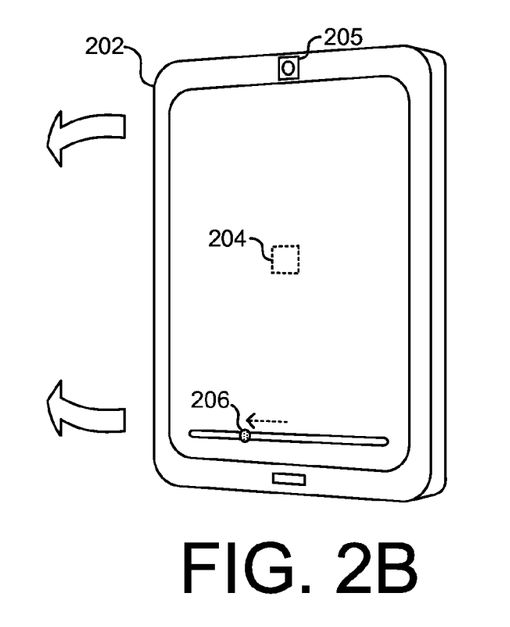
FIG. 2B illustrates an example device embodiment for orientation inclusive interface navigation.

FIG. 2B illustrates an example device embodiment for orientation inclusive interface navigation. The example device 202 in FIG. 2B can be tilted to the left with respect to the Y axis of the device 202. The at least one orientation sensor 204 and/or the at least one image sensor 205 on the device 202 can be utilized to detect this change in orientation (i.e., tilt to the left). The device 202 can in turn cause the current playback position 206 for the media being played to move left. In other words, the media being played can be rewound in response to the tilt to the left.

Figure 2C:
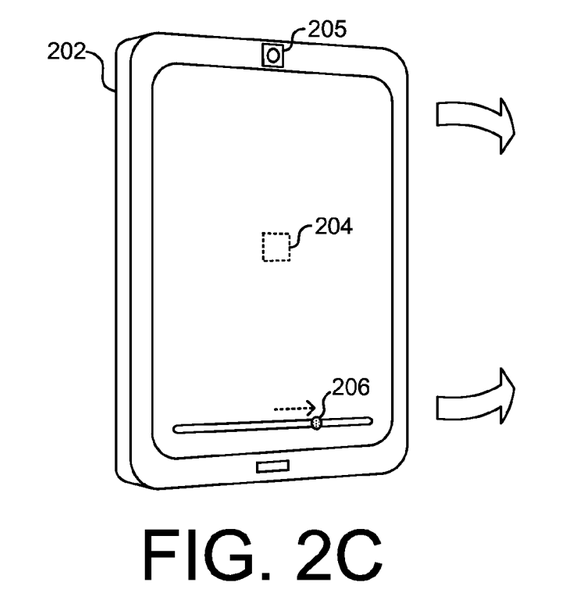
FIG. 2C illustrates an example device embodiment for orientation inclusive interface navigation.

FIG. 2C illustrates an example device embodiment for orientation inclusive interface navigation. In FIG. 2C, the example device 202 can be tilted to the right with respect to the Y axis of the device 202. The at least one orientation sensor 204 and/or the at least one image sensor 205 on the device 202 can be utilized to detect this change in orientation (i.e., tilt to the right). The device 202 can in turn cause the current playback position 206 for the media being played to move right. In other words, the media being played can be fast-forwarded in response to the tilt to the right.

Figure 3:
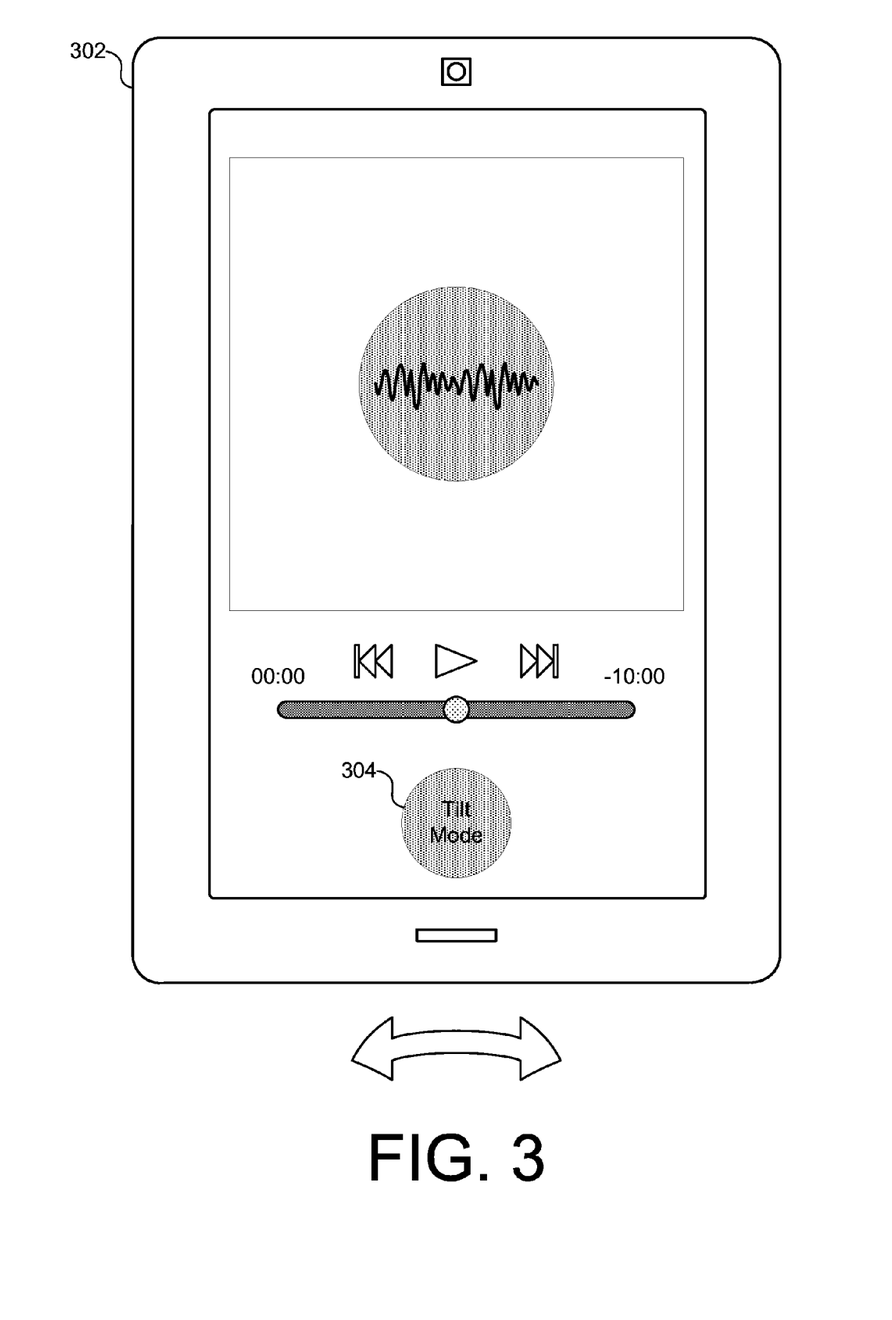
FIG. 3 illustrates an example device embodiment for orientation inclusive interface navigation.

FIG. 3 illustrates an example device embodiment 302 for orientation inclusive interface navigation. In some embodiments, orientation inclusive interface navigation can be initiated when a "tilt mode" is engaged/enabled. In other words, tilting or otherwise changing the orientation of the device 302 will not affect media control/interface navigation when the "tilt mode" is not on/initiated. A tilt mode can be, for example, a mode which allows for orientation inclusive interface navigation.

In some embodiments, the tilt mode can be turned on in response to a button being pressed on the example computing device 302. As shown in FIG. 3, there can be a button 304 to initiate/engage/enable the tilt mode. For example, tapping the button 304 can initiate the tilt mode, such that media playback can be controlled/navigated/adjusted based on changes in the orientation of the device 302; tapping the button 304 again (while the tilt mode is on) stops the tilt mode (e.g., turns off/disables the tilt mode)

In some embodiments, to engage the tilt mode, the button 304 must be pressed and held in order for the tilt mode to be engaged/enabled. In other words, the controlling/adjusting/navigating of media playback based on changing the device's orientation can occur when the button 304 is held, but stops when the button 304 is released. It is also contemplated that there can be various other ways of enabling and disabling the tilt mode, such as tapping/holding somewhere on a touch sensor (e.g., touchscreen), pressing/holding a physical button on the device, or flipping a physical switch on the device, etc.

Figure 4:
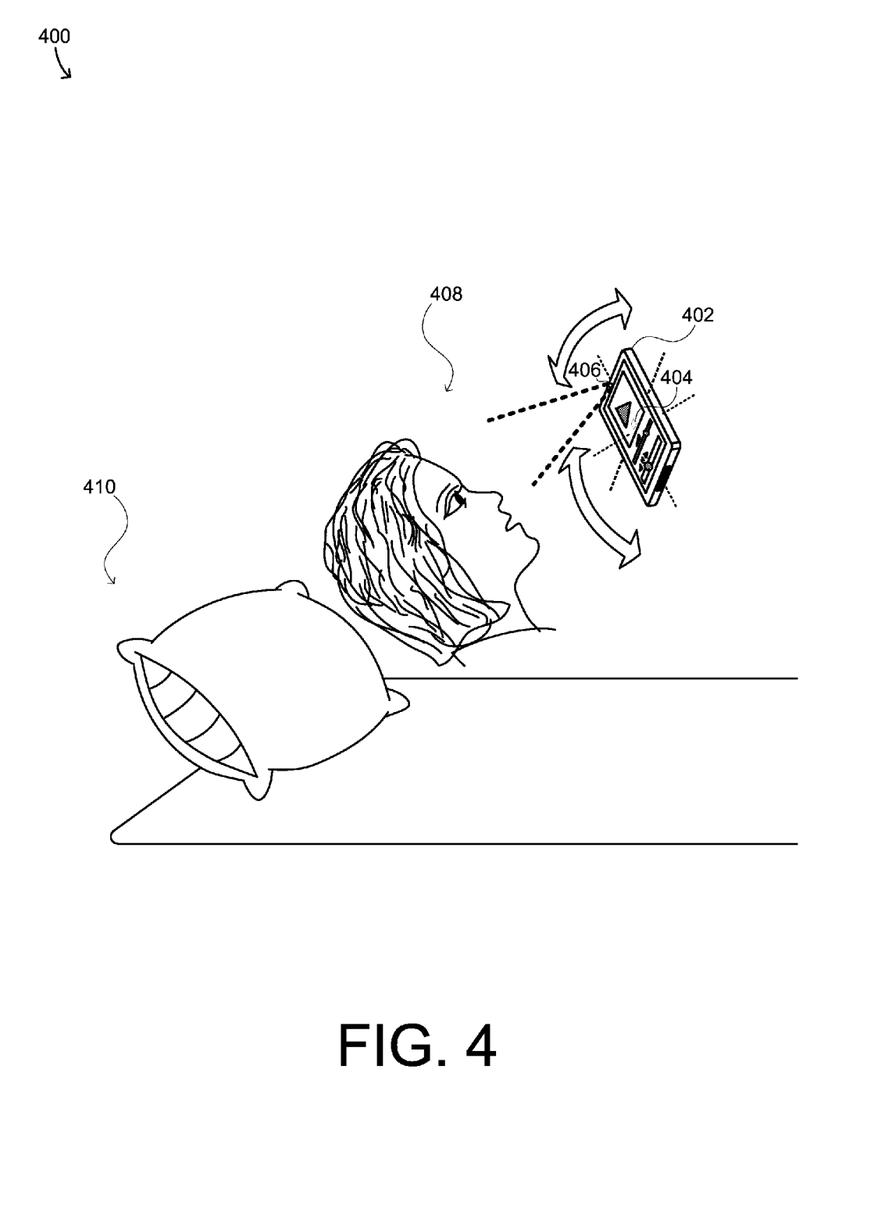
FIG. 4 illustrates an example environment in which orientation inclusive interface navigation can be utilized.

FIG. 4 illustrates an example environment 400 in which orientation inclusive interface navigation can be utilized. In the example environment 400 of FIG. 4, a user 408 of an example computing device 402 can be lying on a bed 410. (Even though a bed 410 is shown, this is for illustrative purposes only. It is contemplated that the user 408 can be situated in any environment, include on a sofa, a desk, a car, standing up, etc.) In some embodiments, the computing device 402 can comprise at least one orientation sensor 404 and at least one image sensor (e.g., camera) 406.

In some embodiments, the at least one image sensor 406 can be configured to capture image data representative of image content including a face of the user 408. In some embodiments, the captured image data including the face of the user 408 can be utilized to determine a location of a head of the user 408. The determined location of the head of the user 408 can be used at least in part to determine an initial/default/normalized orientation of the device 402. The initial/default/normalized orientation of the device 402 can be the orientation of the device 402 at which the user 408 engages with one or more media files being played on the device 402.

For example, referring back to the example environment 400 of FIG. 4, the user 408 can be lying on the bed 410 and holding the computing device 402 at a particular orientation. The user 408 can be engaging/perceiving a media file played on the device 402 at the particular orientation. The particular orientation of the device at which the user 408 is engaging/perceiving the media can be deemed as the initial/default/normalized orientation of the device 402. In some embodiments, using the at least one orientation sensor 404, the device 402 can determine its present orientation with respect to its X, Y, and Z axes and set this present orientation as the initial/default/normalized orientation. Accordingly, any tilt (including tilt direction, amount, speed, etc.) will be measured with respect to the initial/default/normalized orientation.

In some embodiments, the at least one image sensor 406 can capture image data representative of image content including the head of the user of the computing device. The computing device 402 can determine the location of the head of the user included in the captured image data. The determining of the initial orientation of the device 402 can be further based at least in part on the determined location of the head of the user. In some embodiments, the determining of the initial orientation of the computing device further based at least in part on the determined location of the head of the user can include determining the initial orientation to be substantially parallel to a face of the user, the face being associated with the determined location of the head of the user.

Figure 5:
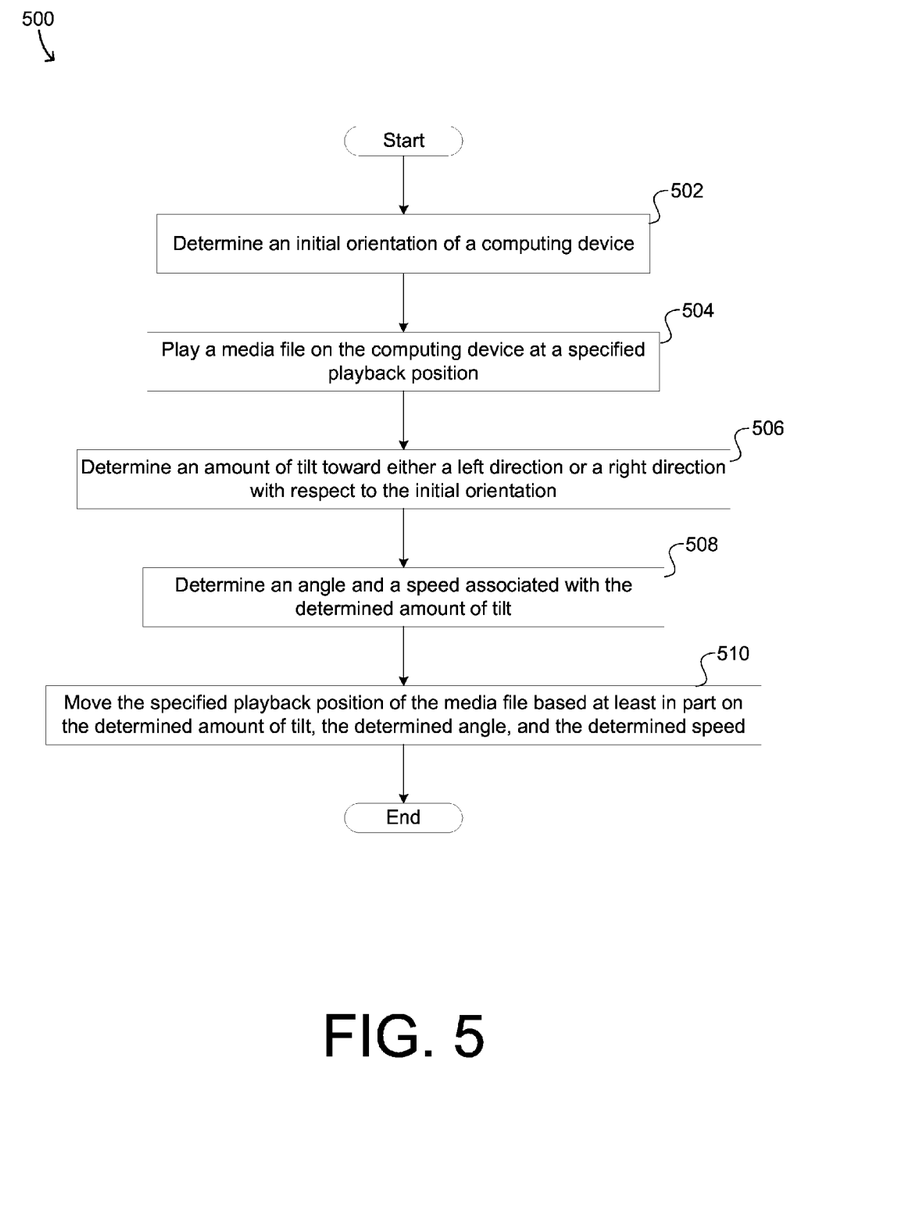
FIG. 5 illustrates an example method embodiment for orientation inclusive interface navigation.

FIG. 5 illustrates an example method embodiment 500 for orientation inclusive interface navigation. It should be understood that there can be additional, fewer, or alternative steps performed in similar or alternative orders, or in parallel, within the scope of the various embodiments unless otherwise stated. In some embodiments, the example method embodiment 500 can start with determining an initial orientation of a computing device based, at least in part, on using at least one of a gyroscope or an accelerometer on the computing device, at step 502. The example method 500 can play a media file on the computing device at a specified playback position, at step 504.

Step 506 can involve determining an amount of tilt toward either a left direction or a right direction with respect to the initial orientation. The amount of tilt toward either the left direction or the right direction can be determined using, at least in part, the at least one of the gyroscope or the accelerometer. The method 500 can, at step 508, determine an angle and a speed associated with the determined amount of tilt using, at least in part, the at least one of the gyroscope or the accelerometer. At step 510, the example method 500 can move the specified playback position of the media file based at least in part on the determined amount of tilt, the determined angle, and the determined speed.

Figure 6:
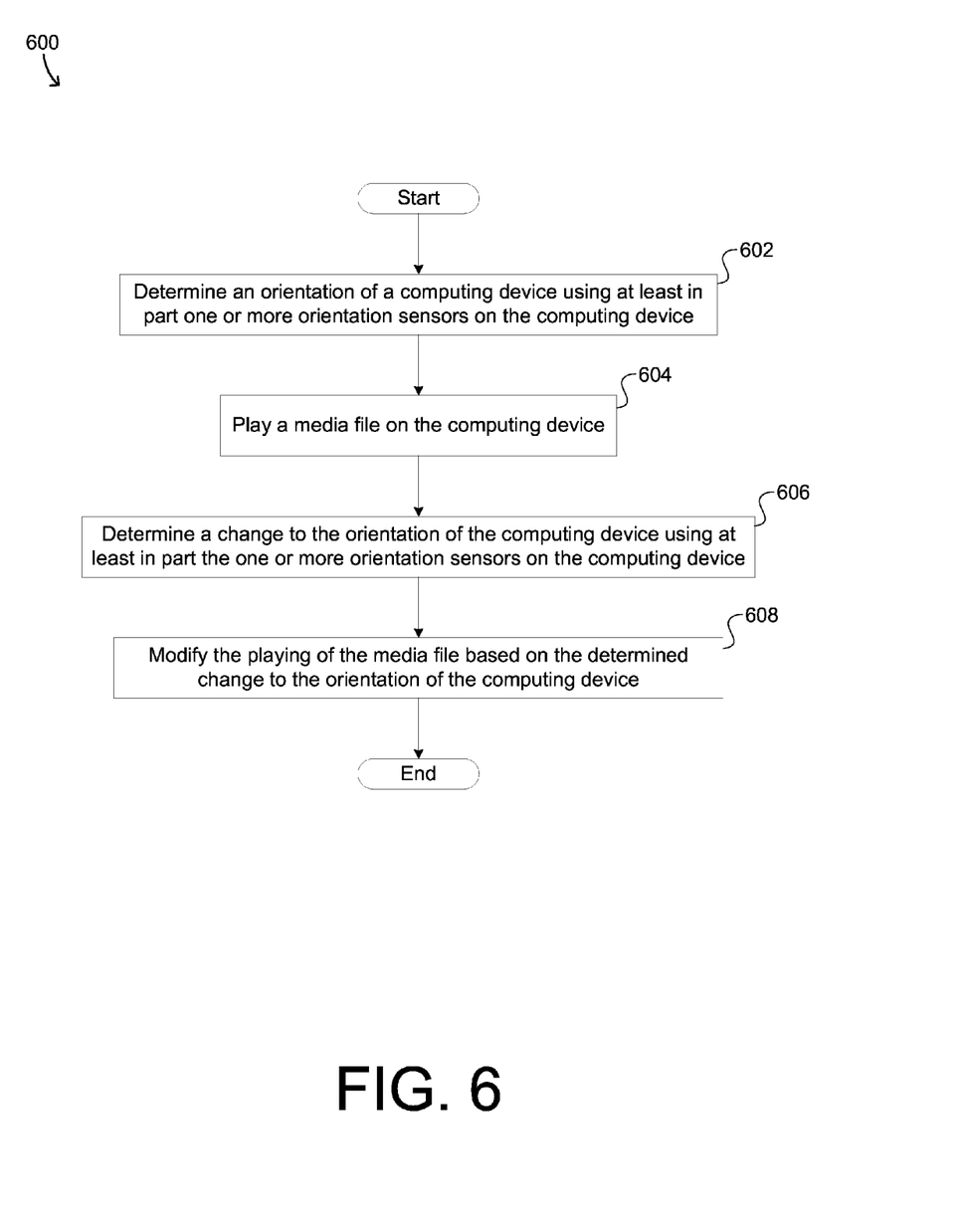
FIG. 6 illustrates an example method embodiment for orientation inclusive interface navigation.

FIG. 6 illustrates an example method embodiment 600 for orientation inclusive interface navigation. Again, it should be understood that there can be additional, fewer, or alternative steps performed in similar or alternative orders, or in parallel, within the scope of the various embodiments unless otherwise stated. At step 602, the example method embodiment 600 can determine an orientation of a computing device using at least in part one or more orientation sensors on the computing device. At step 604, the example method 600 can play a media file on the computing device. Step 606 can involve determining a change to the orientation of the computing device using at least in part the one or more orientation sensors on the computing device. At step 608, the method can modify the playing of the media file based on the determined change to the orientation of the computing device.

In some embodiments, the computing device can be positioned (substantially) horizontal, as opposed to being positioned (substantially) vertical as shown in FIG. 1 through FIG. 4. When placed horizontally, the vertical axis and horizontal axis of the device will change accordingly. For example, referring back to FIG. 1 for illustrative purposes, if the device 102 was placed horizontally (e.g., the device being rotated 90 degrees clockwise or counterclockwise with respect to the Z axis 110), then the device's Y axis would be 106, its X axis would be 108, and its Z axis would still be 110.

In some embodiments, there can be a minimum and/or maximum threshold for the amount, speed, etc. of the tilt. For example, if the user tilts the device an amount below a minimum tilt amount threshold, it would be the same as if the user was not tilting the device. In another example, if the user tilts the device an amount above a maximum tilt amount threshold, it would be the same as if the user was tilting the device at the maximum tilt amount threshold. Similarly, for example, if the user tilts the device at a speed above a maximum tilt speed threshold, then it would be as if the user was tilting at the maximum tilt speed threshold. A person of ordinary skill in the art would know that there are various other features and/or adjustments in accordance with the present disclosure.

In some embodiments, the computing device can provide a scroll bar for the user adjust a volume for media playback. For example, a user can tilt the device with respect to the Y axis of the device in order to fast-forward or rewind (e.g., right or left, respectively), and the user can tilt the device with respect to the X axis to increase or decrease volume (e.g., tilt the top of the device away from the user or tilt the bottom of the device away from the user, respectively).

Various embodiments consistent with the present disclosure can also be implemented for interface navigation. In some embodiments, orientation sensing can be utilized to traverse through albums, movies, folders, books, email, voicemail, text messages, applications, etc. For example, tilting the device to the left can move through previous photo libraries, photo slideshows, audio notes, music, etc., whereas tilting right can move through next items.

Figure 7:
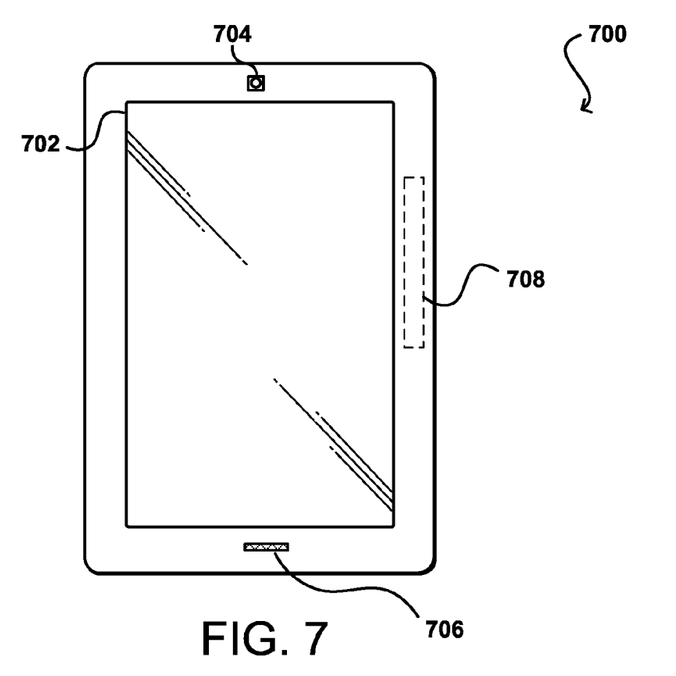
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
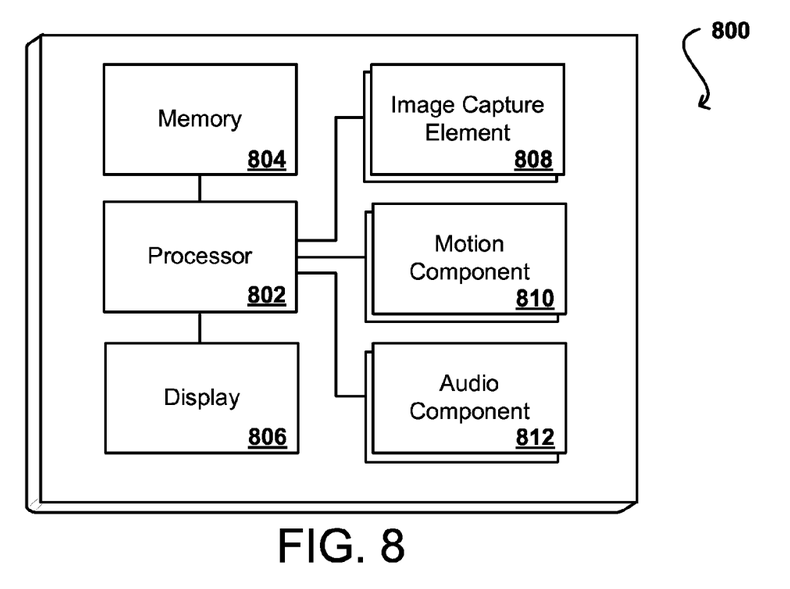
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
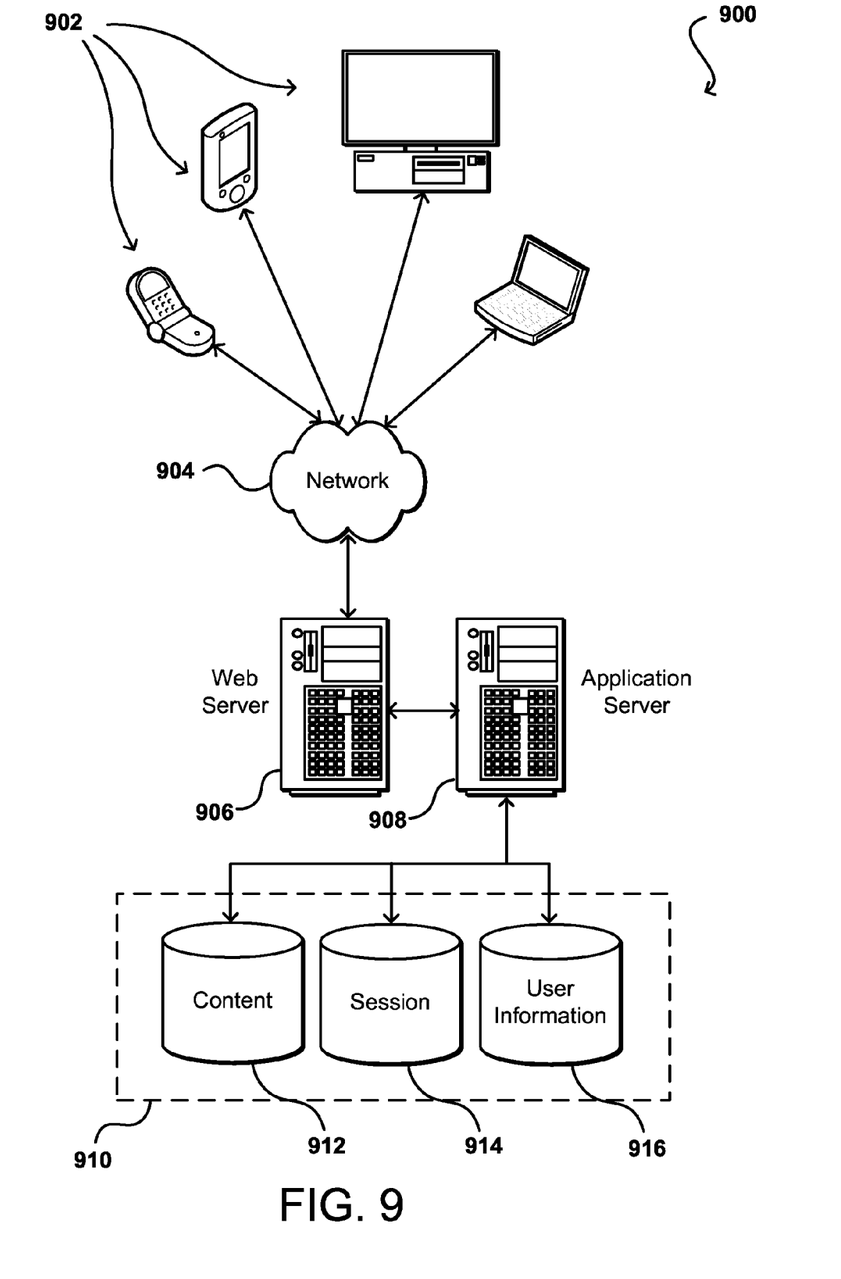
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for orientation inclusive interface navigation, comprising:
   capturing image data representative of image content including at least a portion of a head of a user, the image data being captured using at least one image sensor on a computing device;
   determining a position of the head of the user relative to the computing device based at least in part on the captured image data;
   determining an initial orientation of the computing device based at least in part on the determined position of the head of the user;
   determining that a change in a current orientation of the computing device relative to the initial orientation is greater than a threshold, the threshold related to at least one of an angle and a speed of rotation of the computing device;
   determining a direction associated with the change to the current orientation relative to the initial orientation;
   determining the speed of rotation corresponding to the change to the current orientation relative to the initial orientation; and
   adjusting a playback rate of at least one of video or audio content by an amount corresponding to the direction, the angle, and the speed of rotation associated with the change to the current orientation relative to the initial orientation.

2. The computer-implemented method of claim 1, wherein determining the initial orientation of the computing device is based at least in part on a plane substantially parallel to a face.

3. The computer-implemented method of claim 1, wherein the amount by which the playback rate is adjusted is proportional to an amount by which at least one of the angle and speed of rotation changes.

4. A computer-implemented method comprising:
   determining an orientation of a computing device using one or more sensors of the computing device;
   capturing image data representative of image content including at least a portion of a head of a user, the image data being captured using at least one image sensor of the computing device;
   determining a position of the head of the user relative to the computing device based on the captured image data, wherein determining the orientation of the computing device is further based at least in part on the determined position of the head of the user;
   determining a change to the orientation of the computing device using the one or more sensors of the computing device;
   determining a direction associated with the change to the orientation of the computing device;
   determining a speed associated with the change to the orientation of the computing device; and
   adjusting a presentation of at least one of video or audio content at a rate corresponding to the change to the orientation, the direction associated with the change to the orientation, and the speed associated with change to the orientation.

5. The computer-implemented method of claim 4, wherein adjusting the presentation of the at least one of video or audio content includes reversing a playback of the at least one of video or audio content in response to the change to the orientation being determined to be toward a first direction.

6. The computer-implemented method of claim 4, wherein adjusting the presentation of the at least one of video or audio content includes moving forward a playback of the at least one of video or audio content in response to the change to the orientation being determined to be toward a second direction.

7. The computer-implemented method of claim 4, wherein adjusting the presentation of the at least one of video or audio content includes at least one of restarting the presentation of the at least one of video or audio content or presenting previous video or audio content, the adjusting being in response to the change to the orientation being determined to be toward a first direction and in response to at least one of an amount associated with the change to the orientation of the computing device being above a specified amount threshold or the speed being above a specified speed threshold.

8. The computer-implemented method of claim 4, wherein adjusting the presentation of the at least one of video or audio content includes presenting next video or audio content in response to the change to the orientation being determined to be toward a second direction and in response to at least one of an amount associated with the change to the orientation of the computing device being above a specified amount threshold or the speed being above a specified speed threshold.

9. The computer-implemented method of claim 4, wherein adjusting the presentation of the at least one of video or audio content includes modifying a volume of the presentation of the at least one of video or audio content based on the determined change to the orientation of the computing device.

10. The computer-implemented method of claim 4, wherein the determining the change to the orientation of the computing device comprises determining the change to the orientation to be at least one of a tilt, turn, or twist of the computing device with respect to at least a substantially vertical axis of the computing device.

11. The computer-implemented method of claim 4, wherein adjusting the presentation of the at least one of video or audio content occurs when a mode for orientation inclusive interface navigation is enabled.

12. The computer-implemented method of claim 4, wherein the one or more sensors include at least one of a gyroscope, an electronic compass, an inertial sensor, and an accelerometer.

13. A computing device comprising:
   one or more sensors;
   at least one image sensor configured to capture image data representative of image content including at least a portion of a head of a user;
   a processor; and
   a memory device including instructions that, when executed by the processor, cause the computing device to:
   determine an orientation of the computing device using one or more sensors of the computing device;
   determine a position of the head of the user relative to the computing device based on the captured image data, wherein determining the orientation of the computing device is further based at least in part on the determined position of the head of the user;
   determine a change to the orientation of the computing device using the one or more sensors of the computing device;
   determine a direction associated with the change to the orientation of the computing device;
   determine a speed associated with the change to the orientation of the computing device; and
   adjust a presentation of at least one of video or audio content at a rate corresponding to the change to the orientation, the direction associated with the change to the orientation, and the speed associated with the change to the orientation.

14. The computing device of claim 13, wherein the instructions, when executed by the processor to cause the computing device to adjust the presentation of the at least one of video or audio content, further cause the computing device to adjust the presentation of the at least one of video or audio content when a mode for orientation inclusive interface navigation is enabled.

15. The computing device of claim 13, wherein the one or more sensors include at least one of a gyroscope, an electronic compass, an inertial sensor, and an accelerometer.

16. A non-transitory computer-readable storage medium including instructions for identifying elements, the instructions when executed by a processor of a computing device causing the computing device to:
   determine an orientation of the computing device using one or more sensors of the computing device;
   capture image data representative of image content including at least a portion of a head of a user, the image data being captured using at least one image sensor of the computing device;
   determine a position of the head of the user relative to the computing device based on the captured image data, wherein determining the orientation of the computing device is further based at least in part on the determined position of the head of the user;
   determine a change to the orientation of the computing device using the one or more sensors of the computing device;
   determine a direction associated with the change to the orientation of the computing device;
   determine a speed associated with the change to the orientation of the computing device; and
   adjust a presentation of at least one of video or audio content at a rate corresponding to the change to the orientation, the direction associated with the change to the orientation, and the speed associated with the change to the orientation.

17. The non-transitory computer-readable storage medium of claim 16, wherein the instructions, when executed by the processor to cause the computing device to adjust the presentation of the at least one of video or audio content, further cause the computing device to reverse a playback of the at least one of video or audio content in response to the change to the orientation being determined to be toward a first direction.

18. The non-transitory computer-readable storage medium of claim 16, wherein the instructions, when executed by the processor to cause the computing device to adjust the presentation of the at least one of video or audio content, further cause the computing device to move forward a playback of the at least one of video or audio content in response to the change to the orientation being determined to be toward a second direction.

19. The non-transitory computer-readable storage medium of claim 16, wherein the instructions, when executed by the processor to cause the computing device to adjust the presentation of the at least one of video or audio content, further causes the computing device to restart the presentation of the at least one of video or audio content or present previous video or audio content in response to the change to the orientation being determined to be toward a first direction and in response to at least one of an amount associated with the change to the orientation of the computing device being above a specified amount threshold or the speed being above a specified speed threshold.

20. The non-transitory computer-readable storage medium of claim 16, wherein instructions, when executed by the processor to cause the computing device to adjust the presentation of the at least one of video or audio content, further cause the computing device to present next video or audio content in response to the change to the orientation being determined to be toward a second direction and in response to at least one of an amount associated with the change to the orientation of the computing device being above a specified amount threshold or the speed being above a specified speed threshold.

* * * * *